(12) United States Patent
Chen (10) Patent No.: US 8,522,387 B2
(45) Date of Patent: Sep. 3, 2013

(54) SWIVELING LOCKING MECHANISM OF A TELESCOPIC ROD OF A MOP

(75) Inventor: Yung-Hua Chen, Taipei County (TW)

(73) Assignee: Tuo Shen International Corporation Limited, Taoyuan County (TW)

( * ) Notice: Subject to any disclaimer, the term of this patent is extended or adjusted under 35 U.S.C. 154(b) by 88 days.

(21) Appl. No.: 13/188,601

(22) Filed: Jul. 22, 2011

(65) Prior Publication Data

US 2011/0274481 A1    Nov. 10, 2011

Related U.S. Application Data

(63) Continuation-in-part of application No. 12/458,119, filed on Jul. 1, 2009, now abandoned.

(51) Int. Cl.
*F16B 7/10* (2006.01)
*A47L 13/20* (2006.01)

(52) U.S. Cl.
USPC ....... 15/119.1; 403/109.5; 403/290; 403/297; 403/313; 403/314; 15/120.2; 15/228; 15/229.2; 15/229.6

(58) Field of Classification Search
USPC .............. 403/109.5, 261, 263, 289, 290, 297, 403/298, 302, 309, 313, 314, 371, 373–374.2, 403/374.5, 409.1, DIG. 4, DIG. 9; 15/119.1, 15/120.2, 228, 229.2, 229.6
See application file for complete search history.

(56) References Cited

U.S. PATENT DOCUMENTS

| | | | | |
|---|---|---|---|---|
| 1,182,288 | A | * | 5/1916 | Mack ............................ 403/370 |
| 2,098,581 | A | * | 11/1937 | Jones .......................... 174/84 R |
| 2,841,425 | A | * | 7/1958 | Oeters .......................... 403/104 |
| 4,761,092 | A | * | 8/1988 | Nakatani ....................... 403/104 |
| 4,948,149 | A | * | 8/1990 | Lin et al. ....................... 473/492 |
| 5,046,693 | A | * | 9/1991 | Browne ........................ 248/159 |
| 5,348,415 | A | * | 9/1994 | Carlsson ................... 403/374.5 |
| 5,409,321 | A | * | 4/1995 | Chen ............................ 403/321 |
| 6,004,064 | A | * | 12/1999 | Franz ......................... 403/322.4 |
| 6,142,698 | A | * | 11/2000 | Nutter ........................ 403/109.1 |
| 6,676,329 | B2 | * | 1/2004 | Mandon et al. ............... 403/377 |
| 6,701,578 | B1 | * | 3/2004 | Lu ................................... 16/429 |
| 2011/0013980 | A1 | * | 1/2011 | Bensussan et al. ........... 403/373 |

\* cited by examiner

Primary Examiner — Victor MacArthur
(74) Attorney, Agent, or Firm — Rosenberg, Klein & Lee (57) ABSTRACT

A swiveling locking mechanism of a telescopic rod of a mop, including: an internal clamping sleeve, an external clamping cylinder, and a U-shaped locking arm. The external clamping cylinder is mounted on the internal clamping sleeve and the lower portion of the external clamping cylinder is constructed as a trumpet-shaped opening mounted from top to bottom on the conic body. The U-shaped locking arm includes an eccentric cam is provided with a mounting hole corresponding to the axle hole of the internal clamping sleeve. Thus, when moving downward the U-shaped locking arm, the external clamping cylinder rises, and the trumpet-shaped opening of the external clamping cylinder is brought in a loosened position. As a result, the indentation is loosened and the internal rod and the external rod are brought into the unlocked and telescopic state and vice versa.

3 Claims, 7 Drawing Sheets

SWIVELING LOCKING MECHANISM OF A TELESCOPIC ROD OF A MOP

This patent application is a Continuation-In-Part of Ser. No. 12/458,119, filed on Jul. 1, 2009, currently pending.

BACKGROUND OF THE INVENTION

1. Field of the Invention

The invention relates to a swiveling locking mechanism of a telescopic rod of a mop, and more particularly to a structure in which an internal sleeve is clamped or unclamped by an external swivel action such that the telescopic rod is brought in a locked or unlocked state.

2. Description of the Related Art

It is laborious when people wash floors in a kneeling position. Therefore, a mop with a handle is developed. The user can stand and easily hold the handle to move the mop for washing the floor.

The handle made specifically to be grasped or held by the hand of the operator may consist of an external rod and an internal rod for making the handle in a telescopic state by means that the internal rod is driven by the external rod. The telescopic function is beneficial for the transportation or for storage with less space. However, a locking mechanism is required at the attachment position of the external rod and internal rod for locking them in place or unlocking them in a telescopic state.

U.S. Pat. No. 4,948,149 disclosed a net post for ball games comprising primarily a plurality of hollow tubes which are of different diameters and can be fitted one over the other. An adaptor comprising an outer screwed sleeve member and a lining press member is provided for the connection of two hollow tubes. A slidable threading lug is fitted over each of the hollow tubes. By fitting the hollow tubes one over the other, the net posts of the 149' Patent can be reduced in dimensions to facilitate storage, shipment and carrying and can also facilitate adjustment and operation.

U.S. Pat. Nos. 2,098,581, 2,841,425, 6,142,698 and 6,701,578, disclosed the same elements which provided for connection of two hollow tubes as U.S. Pat. No. 4,948,149 such that it is not convenient to rotate multiple circles of the outer screwed sleeve in a clockwise or anti-clockwise direction to adjust into the Lock or Unlock state. Especially, for small strength users who are unable to rotate the outer screwed sleeve. Besides, it is not easy to control the cyclomatic number so that the defective rate of the outer screwed sleeve can be raised. Therefore, there is room for improvement.

SUMMARY OF THE INVENTION

An object of the invention is to provide a swiveling locking mechanism of a telescopic rod of a mop that has an ergonomic operation structure for providing the operator with a convenient and effort-saving use.

Another object of the invention is to provide a swiveling locking mechanism of a telescopic rod of a mop that avoids an improper operation so that the defective rate can be reduced for prolonging the service life.

In order to achieve the above-mentioned objects, a swiveling locking mechanism of a telescopic rod of a mop in accordance with the invention includes an internal rod, an external rod having a bottom portion in a telescopic connection with a top portion of the internal rod, a disc attached to the bottom of the internal rod and having a plurality of mop yarns, and a locking mechanism mounted on the external rod for locking the internal rod and the external rod in place or for unlocking them in a telescopic state. The locking mechanism includes an internal clamping sleeve, an external clamping cylinder, and a U-shaped locking arm. The upper portion of the internal clamping sleeve is constructed as an internal tube for inserting to the middle part of the external rod and fixing the external rod in place. An axle hole is formed in both sides of the internal clamping sleeve and lower portion of the internal clamping sleeve is formed as a conic body having an indentation expands from top to bottom. Moreover, the external clamping cylinder is mounted on the internal clamping sleeve, and the upper portion of the external clamping cylinder is constructed as an external tube corresponding to the internal tube, and both sides of the external tube are provided with two hollow holes corresponding to the axle holes of the internal tube, and the lower portion of the external clamping cylinder is constructed as a trumpet-shaped opening mounted from top to bottom on the conic body.

The U-shaped locking arm includes an eccentric cam at the both inner sides of the opening portion thereof for symmetrically fitting into the hollow holes of the external clamping cylinder. Besides, the eccentric cam is provided with a mounting hole corresponding to the axle hole of the internal clamping sleeve. A swivel protrusion mounted in the mounting hole and the inner portion thereof inserted in the axle hole of the internal clamping sleeve in order to swivel the opening portion of the U-shaped locking arm on the both sides of the external clamping cylinder. The eccentric length from the swivel protrusions to a flange face of the outer side of the eccentric cam is smaller than a half width of both sides of the hollow holes; is greater than a half height between the upper wall and the bottom wall of the hollow holes.

When moving downward the U-shaped locking arm, the eccentric deflects upward and the flange face thereof pushing the upper wall of the hollow hole. In this way, the external clamping cylinder rises and the trumpet-shaped opening of the external clamping cylinder is brought in a loosened position corresponding to the conic body of the internal clamping sleeve. As a result, the indentation is loosened and brings the internal rod and the external rod into the unlocked and telescopic state.

On the other hand, when pulling upward the U-shaped locking arm, the eccentric deflects downward and the flange face thereof pushing the bottom wall of the hollow hole. In this way, the external clamping cylinder falls downward and the trumpet-shaped opening of the external clamping cylinder is brought in a tightened position corresponding to the conic body of the internal clamping sleeve. As a result, the indentation is so clamped that the internal rod and external rod are in the locked state.

BRIEF DESCRIPTION OF THE DRAWINGS

The accomplishment of this and other objects of the invention will become apparent from the following descriptions and its accompanying figures of which.

DETAILED DESCRIPTION OF THE PREFERRED EMBODIMENT

First of all, referring to FIGS. 1 through 7, a preferred embodiment of the invention includes an internal rod 10, an external rod 20, a disc 40, and a locking mechanism 30. The external rod 20 includes a bottom portion in a telescopic connection with a top portion of the internal rod 10. The disc 40 is attached to the bottom of the internal rod 10 and includes a plurality of mop yarns 41. The locking mechanism 30 is mounted on the external rod 20 for locking the internal rod 10 and the external rod 20 in places or for unlocking them in a telescopic state.

Figure 1:
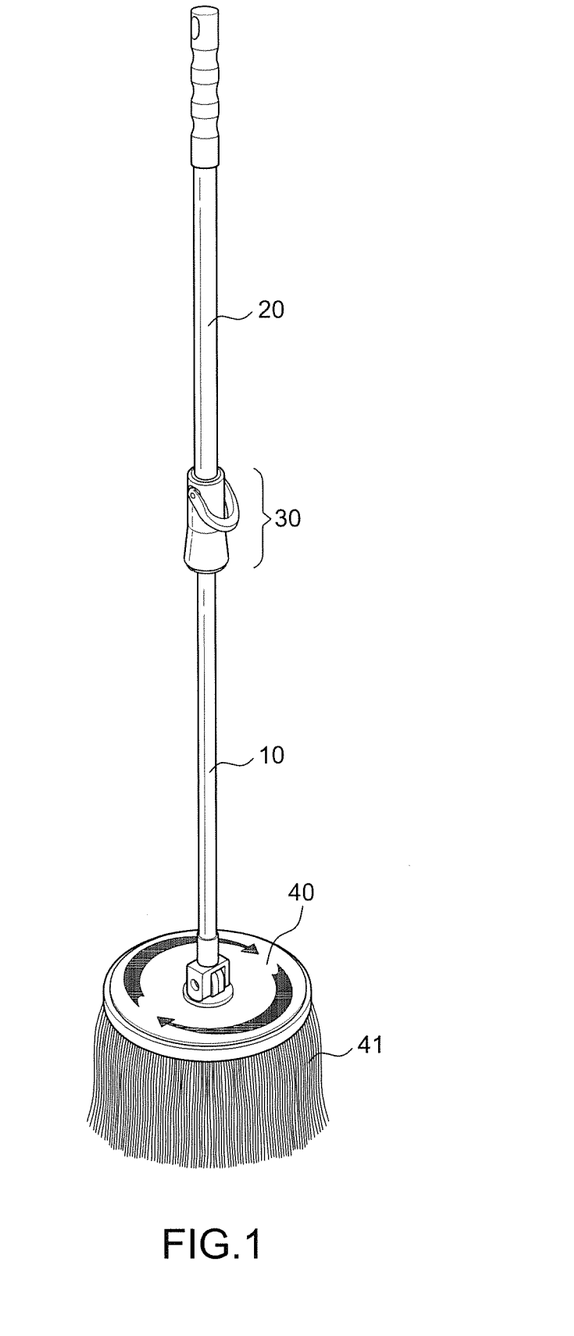
FIG. 1 is a perspective view of a preferred embodiment of the invention.
Figure 2A:
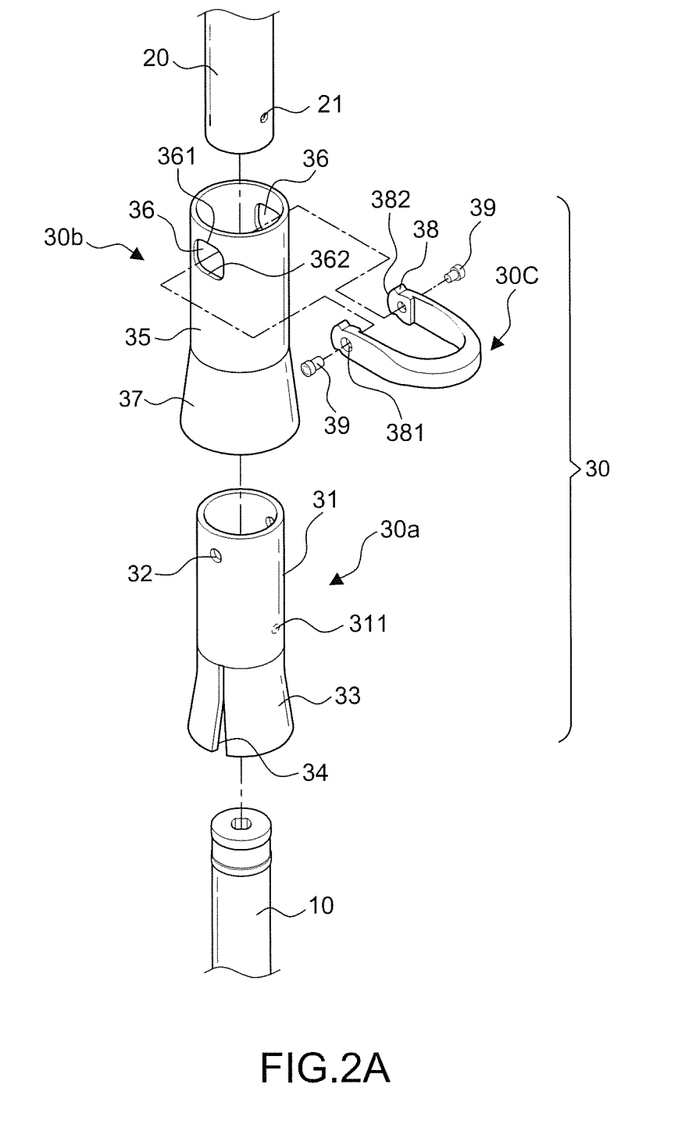
FIGS. 2A and 2B are exploded perspective views of the main structure of the invention.

According to the features of the invention, the locking mechanism 30 includes an internal clamping sleeve 30a, an external clamping cylinder 30b, and a U-shaped locking arm 30c. The upper portion of the internal clamping sleeve 30a is constructed as an internal tube 31 for the insertion and the fixing of the bottom of the external rod 20 in place. In this embodiment, the internal clamping sleeve 30a made of plastic was inserted and fixed by the external rod 20. In the preferred embodiment, at least one positioning hole 21 on the external rod 20 corresponds to at least one convex dot 311 on the internal rod 10 for locking to each other. Thus, the internal clamping sleeve 30a and the external rod 20 are stability coupled together. Moreover, the position of the positioning hole 21 and convex dot 311 is able to be exchanged. An axle hole 32 as shown in FIG. 2A is formed in both sides of the internal clamping sleeve 30a. The lower portion of the internal clamping sleeve 30a is formed as a conic body 33 expanding from top to bottom. The conic body 33 includes an indentation 34 extending in axial direction. It is preferable to have more than two indentations 34.

With the reference of FIG. 2A, the external clamping cylinder 30b is mounted on the internal clamping sleeve 30a. The upper portion of the external clamping cylinder 30b is constructed as an external tube 35 corresponding to the internal tube 31. Both sides of the external tube 35 are provided with two hollow holes 36 corresponding to the axle holes 32 of the internal tube 31. According to the embodiment, the hollow holes 36 are non-circular and constructed as rectangular holes; an upper wall 361 and a bottom wall 362 thereof are flat and both sides thereof are arcuate. Moreover, the lower portion of the external clamping cylinder 30b is constructed as a trumpet-shaped opening 37 mounted from top to bottom on the conic body 33.

Figure 2B:
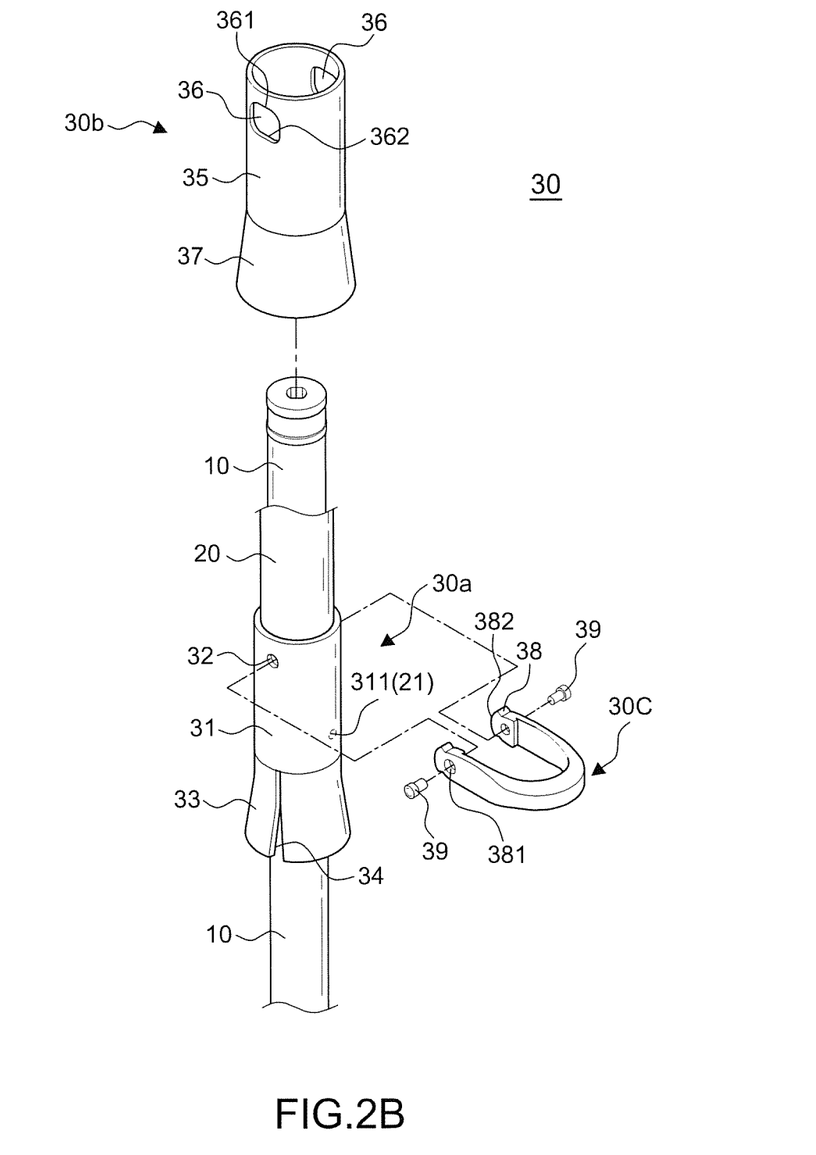
Figure 3A:
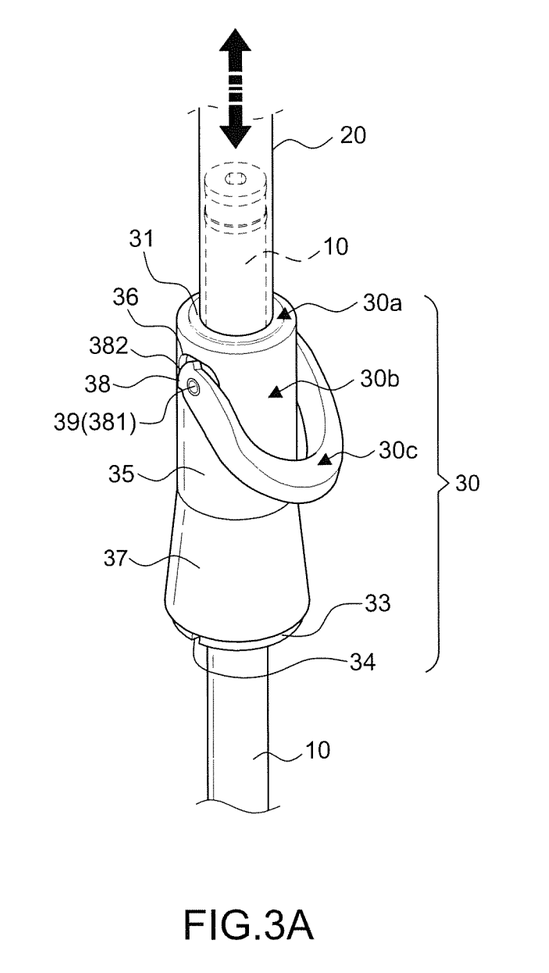
FIG. 3A is combined perspective view of the invention.
Figure 3B:
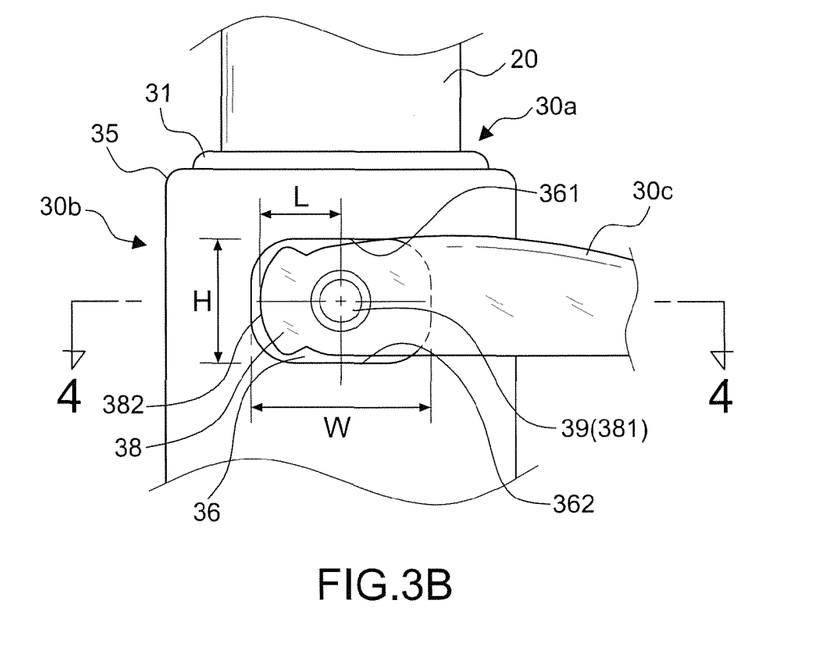
FIG. 3B is a side elevational view of the invention.
Figure 4:
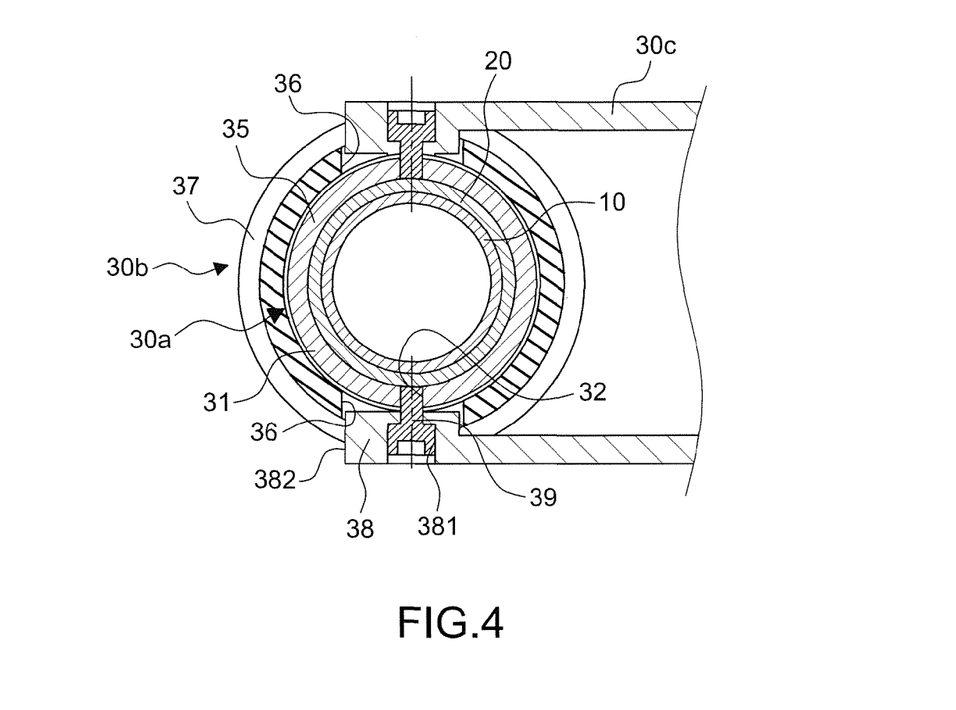
FIG. 4 is a cross-sectional view taken along the line 4-4 in FIG. 3B.

With the reference of FIGS. 2B and 3A, the U-shaped locking arm 30c includes an eccentric cam 38 at the both inner sides of the opening portion thereof for symmetrically fitting into the hollow holes 36 of the external clamping cylinder 30b. Besides, the eccentric cam 38 is provided with a mounting hole 381 corresponding to the axle hole 32 of the internal clamping sleeve 30a. Swivel protrusions 39 mounted in the mounting hole 381 and the inner portion thereof inserted in the axle hole 32 of the internal clamping sleeve 30a in order to swivel the opening portion of the U-shaped locking arm 30c on the both sides of the external clamping cylinder 30b. As shown in FIG. 3B, the eccentric length L from the swivel protrusions 39 to a flange face 382 of the outer side of the eccentric cam 38 is smaller than a half width W of both sides of the hollow holes 36; greater than a half height H between the upper wall 361 and the bottom wall 362 of the hollow holes 36. For example, the width W of the hollow holes 36 is 10 mm, the height H is 7 mm thereof, and the length L of the eccentric cam 38 is 4.5 mm. Above-mentioned size and the shape of the hollow holes 36 are set for the eccentric cam 38 to push the upper wall 361 and the bottom wall 362 thereof when moving the eccentric cam 38.

Figure 5A:
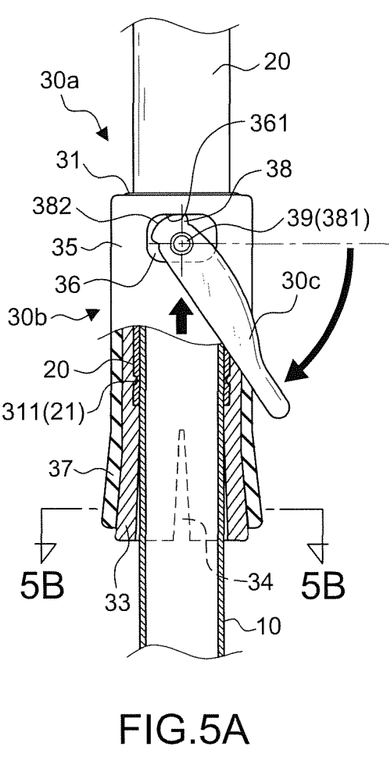
FIG. 5A is a schematic drawing of the invention in a loosened position when the external clamping cylinder is moved upward.
Figure 5B:
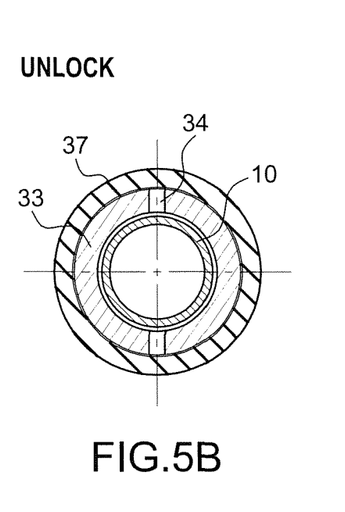
FIG. 5B is cross-sectional view taken along the line 5B-5B in FIG. 5A.

With the reference of FIGS. 5A and 5B, when moving downward the U-shaped locking arm 30c, the eccentric cam 38 deflects upward and the flange face 382 thereof pushing the upper wall 361 of the hollow hole 36. In this way, the external clamping cylinder 30b rises and the trumpet-shaped opening 37 of the external clamping cylinder 30b is brought in a loosened position corresponding to the conic body 33 of the internal clamping sleeve 30a. As a result, the indentation 34 is loosened and brings the internal rod 10 and the external rod 20 into the unlocked and telescopic state.

Figure 6A:
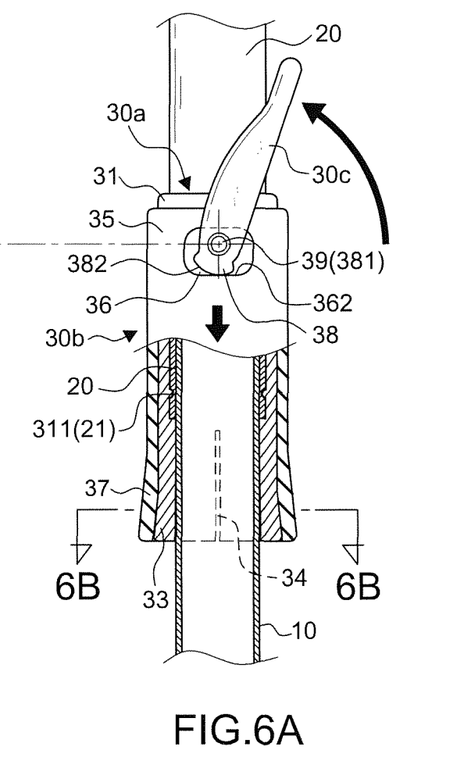
FIG. 6A is a schematic drawing of the invention in a tightened position when the external clamping cylinder is moved downward.
Figure 6B:
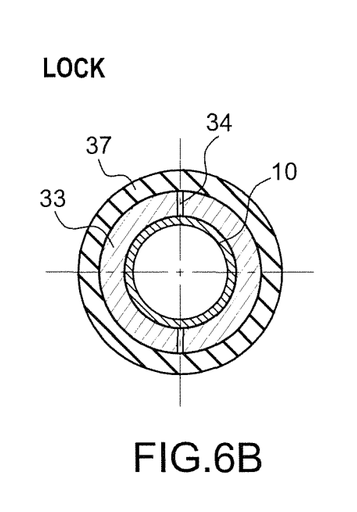
FIG. 6B is a cross-sectional view taken along the line 6B-6B in FIG. 6A.

With the reference of FIGS. 6A and 6B, when pulling upward the U-shaped locking arm 30c, the eccentric cam 38 deflects downward and the flange face 382 thereof pushing the bottom wall 361 of the hollow hole 36. In this way, the external clamping cylinder 30b falls downward and the trumpet-shaped opening 37 of the external clamping cylinder 30b is brought in a tightened position corresponding to the conic body 33 of the internal clamping sleeve 30a. As a result, the indentation 34 is so clamped that the internal rod 10 and external rod 20 are in the locked state.

Figure 7:
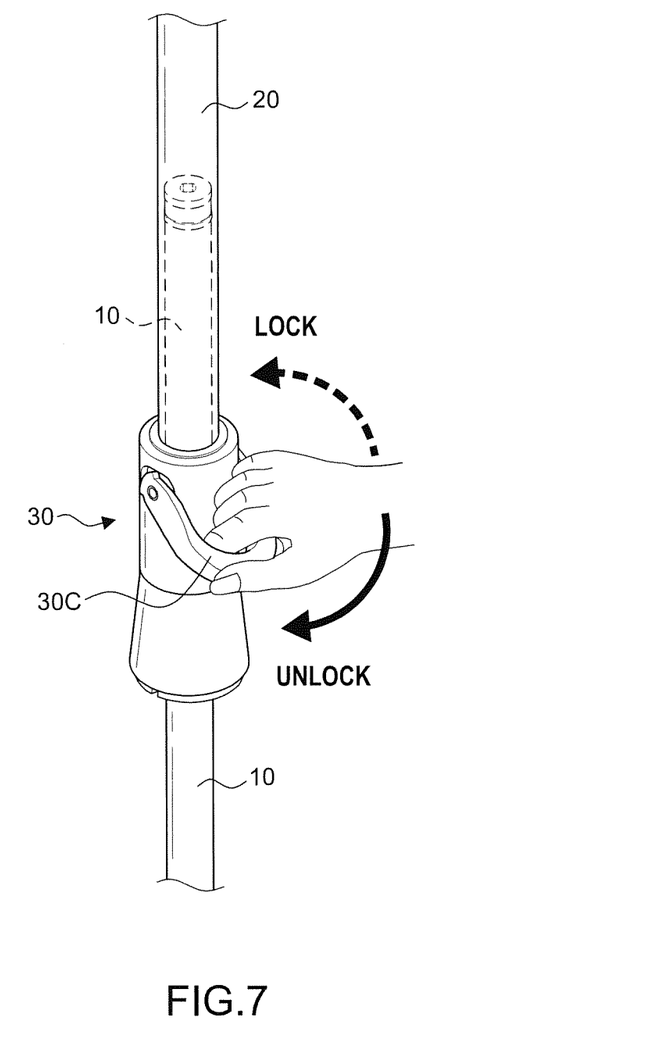
FIG. 7 is an application example of the invention.

The U-shaped locking arm 30c has a longer force arm relative to the eccentric cam 38 so it is effort-saving when operating the U-shaped locking arm 30c. As shown in FIG. 7, the locking mechanism 30 in accordance with the invention has an ergonomic operation structure that provides a convenient and effort-saving using method for the operator moving only the U-shaped locking arm 30c upward or downward in order to bring the internal rod 10 and the external rod 20 in a locked or unlocked state.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A mop comprising:
   a telescopic rod assembly having:
   a) an internal rod;
   b) an external rod having a bottom portion in a telescopic connection with a top portion of the internal rod;
   c) a disc attached to the bottom of the internal rod and having a plurality of mop yarns; and
   d) a swiveling locking mechanism mounted on the external rod for selectively locking the internal rod relative to the external rod in place and for selectively unlocking the internal rod relative to the external rod in a telescopic state, the swiveling locking mechanism including an internal clamping sleeve, an external clamping cylinder, and a U-shaped locking arm;
   wherein the upper portion of the internal clamping sleeve is constructed as an internal tube for inserting and fixing the bottom of the external rod in place, and an axial hole is formed in both sides of the internal clamping sleeve, and the lower portion of the internal clamping sleeve is formed as a conical body expanding from top to bottom, and the conic body includes an indentation;

wherein the external clamping cylinder is mounted on the internal clamping sleeve, and the upper portion of the external clamping cylinder is constructed as an external tube corresponding to the internal tube, and both sides of the external tube are provided with two hollow holes corresponding to the axial holes of the internal tube, and the lower portion of the external clamping cylinder is constructed as a trumpet-shaped opening mounted from top to bottom on the conical body;

wherein the U-shaped locking arm includes an eccentric cam at both inner sides of an opening portion thereof for symmetrically fitting into the hollow holes of the external clamping cylinder, and the eccentric cam is provided with a mounting hole corresponding to the axial hole of the internal clamping sleeve, and swivel protrusions mounted in the mounting hole and the inner portion thereof inserted in the axial hole of the internal clamping sleeve in order to swivel the opening portion of the U-shaped locking arm on the both sides of the external clamping cylinder, and an eccentric length L from the swivel protrusions to a flange face of the outer side of the eccentric cam is smaller than a half width W of both sides of the hollow holes, and greater than a half height H between an upper wall and a bottom wall of the hollow holes;

whereby, when moving downward the U-shaped locking arm, the eccentric cam deflects upward and the flange face thereof pushing the upper wall of the hollow hole, the external clamping cylinder rises and the trumpet-shaped opening of the external clamping cylinder is brought in a loosened position corresponding to the conical body of the internal clamping sleeve, the indentation is loosened and leads the internal rod and the external rod into the unlocked and telescopic state; and whereby, when pulling upward the U-shaped locking arm, the eccentric deflects downward and the flange face thereof pushing the bottom wall of the hollow hole, the external clamping cylinder falls downward and the trumpet-shaped opening of the external clamping cylinder is brought in a tightened position corresponding to the conical body of the internal clamping sleeve, the indentation is clamped such that the internal rod and external rod are in the locked state.

2. The mop as recited in claim 1 wherein said swiveling locking mechanism further includes at least one positioning hole on the external rod correspond to at least one convex dot on the internal rod for locking to each other.

3. The mop as recited in claim 1 wherein the upper wall and the bottom wall of the hollow hole are flat and both sides thereof are arcuate.

* * * * *